Figure 1:
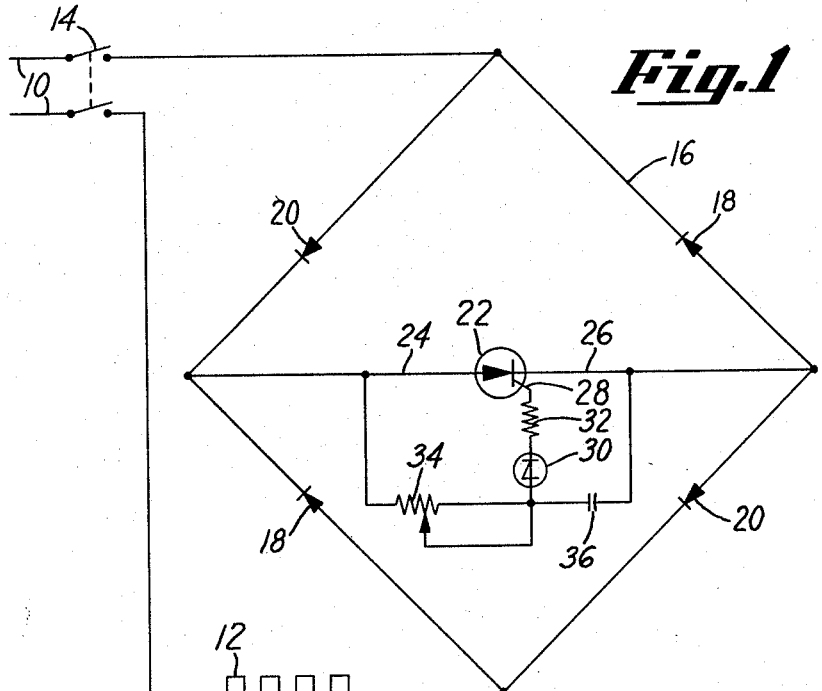

Dec. 15, 1964   C. C. GAMBILL ETAL   3,161,759
ELECTRIC RANGE HEATER CONTROL
Filed Dec. 21, 1961   2 Sheets-Sheet 1

INVENTORS
CHARLES C. GAMBILL
ALFRED B. ROBY
BY Edwin S. Dybvig
THEIR ATTORNEY

United States Patent Office 3,161,759
Patented Dec. 15, 1964

3,161,759
ELECTRIC RANGE HEATER CONTROL
Charles C. Gambill, Tipp City, and Alfred B. Roby, Dayton, Ohio, assignors to General Motors Corporation, Detroit, Mich., a corporation of Delaware
Filed Dec. 21, 1961, Ser. No. 161,005
11 Claims. (Cl. 219—494)

This invention relates to a control circuit for varying the output of an electric heater in a kitchen range or the like.

One of the big problems in controlling the heaters of an electric range is that of providing switch means capable of handling the heavy current encountered. Conventional mechanical switches are a source of frequent trouble due to the burning out of the switch contacts. It is an object of this invention to provide a heater control which does not require the use of a mechanical switch having troublesome switch contacts.

It is an object of this invention to provide a semiconductor type of control which provides for infinite variation of the current flow to the heater and which does not require movable switch contacts.

More particularly, it is an object of this invention to provide a heater control system including a plural path rectifier network comprising first and second groups of unidirectional conducting devices connected between the power source and the heater and a silicon controlled rectifier connected in series with the unidirectional conducting devices, the latter being under control of a four-layer diode circuit.

Further objects and advantages of the present invention will be apparent from the following description, reference being had to the accompanying drawings wherein a preferred embodiment of the present invention is clearly shown.

Figure 2:
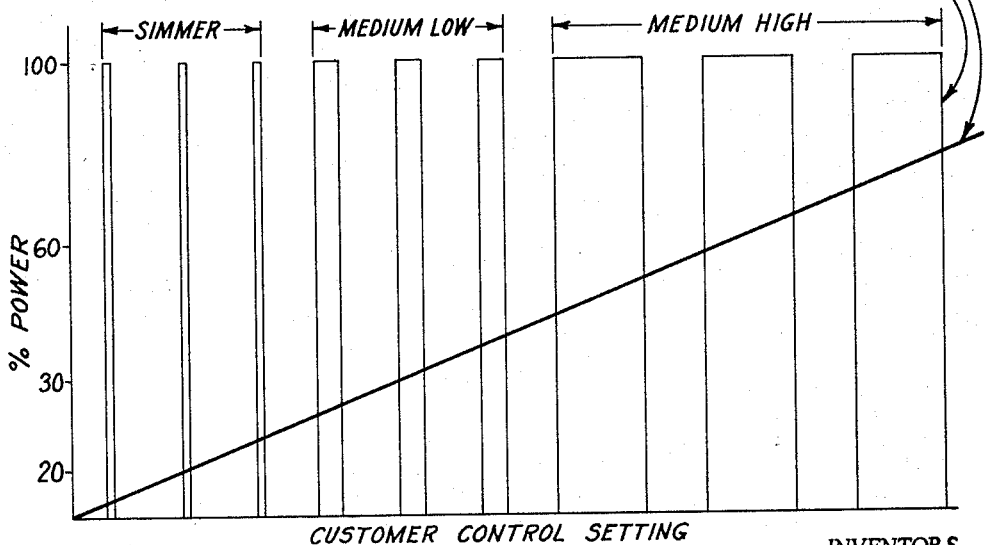

In the drawings:

FIGURE 1 is a schematic diagram showing a preferred embodiment of the invention;

FIGURE 2 schematically shows the relationship between the power supplied to a heating element and the setting of the heat control knob both in a conventional range and in a range using the present invention.

Figure 3:
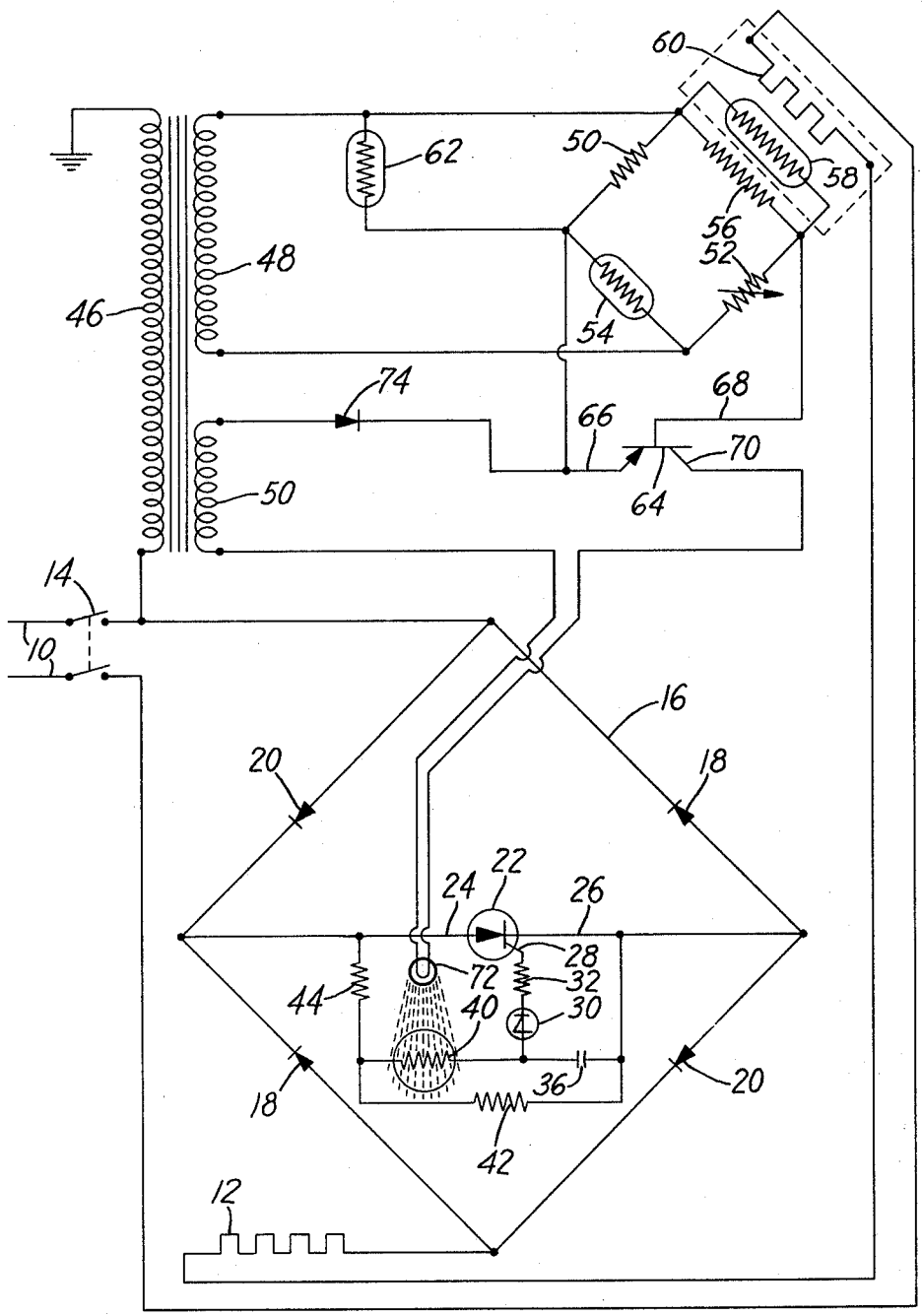

FIGURE 3 shows a modification of the circuit shown in FIGURE 1 for use in controlling the heat supplied to the surface unit of a range in response to the temperature of a skillet or the like placed on the surface unit.

Referring now to FIGURE 1 of the drawing, reference numeral 10 designates the power supply lines through which power is supplied to an electrical load such as the heating element 12 of an electric range. Upon closing the main line switch 14, power is supplied to the heater 12 through a plural path rectifier network, generally designated by the reference numeral 16. The network 16 includes a first pair of diodes 18 which are arranged to pass a controlled amount of current to the electric heater during one portion of each cycle and reference numerals 20 designate a second pair of diodes arranged to pass a controlled amount of current to the heating element 12 during another portion of each cycle. A silicon controlled rectifier 22 having an input terminal 24 and an output terminal 26 and a gate or control terminal 28 is arranged in the network, as shown, whereby any current flowing to the heater 12 is required to pass through the silicon controlled rectifier 22. Thus, it is apparent that current flowing through the silicon controlled rectifier 22 flows in the same direction for all portions of each cycle of the applied voltage.

A four-layer diode 30 is connected in series with a current limiting resistance 32 and the gate or control terminal 28 of the silicon controlled rectifier 22. A variable resistance or potentiometer element 34 and a capacitor 36 are connected in series across the input and output terminals 24 and 26 of the silicon controlled rectifier 22. The capacitor 36 is arranged in the circuit, as shown, and charges up through the potentiometer 34 until the condenser voltage equals the break-over voltage of the four-layer diode 30. The capacitor then discharges through the gate circuit of the silicon controlled rectifier 22 and the silicon controlled rectifier fires as the result thereof. In this manner the four-layer diode does not fire until it reaches a break-over voltage which is delayed by the time constant of the potentiometer and capacitor network in proportion to the resistance of the potentiometer 34. A control knob (not shown) on the instrument panel of the electric range would be used for varying the resistance of the potentiometer 34. The silicon controlled rectifier 22 can be controlled over approximately 180° conduction angle by delaying the firing voltage of the four-layer diode.

FIGURE 2 of the drawings illustrates the difference between the operation of a heater controlled in accordance with this invention and the operation of a heater controlled by conventional heater controls of the type now used commercially wherein the power is repeatedly turned on 100% during variable intervals of time so as to vary the heat output. It will be noted that in a conventional control, full power is supplied to the heating element at repeated intervals even when only a small amount of heat is wanted.

FIGURE 3 shows a modified form of heater control which is similar in all respects to the control described hereinabove in connection with FIGURE 1 except that a light dependent resistor 40 has been substituted for the potentiometer 34 shown in FIGURE 1 of the drawings so as to make it possible to control the heat supplied to the surface element in response to the temperature of a skillet or the like placed on the surface heating unit. Fixed resistance elements 42 and 44 have been added and these form a voltage divider which keeps the voltage across the light dependent resistor 40 at a safe value.

A control circuit is provided for varying the amount of light to which the light dependent resistor 40 is subjected. The power for the control circuit is provided from a transformer having a primary winding 46 and a pair of secondary windings 48 and 50 which are arranged as shown. The secondary winding 48 supplies power to the input terminals of a Wheatstone bridge network as shown. This network includes a fixed resistance 50, a customer controlled variable resistance 52, a pan temperature sensing thermistor 54, a fixed resistance 56 and a thermistor 58 connected in parallel with the fixed resistance 56. The thermistor 58 is arranged adjacent to a small heater 60 which is connected in series with the main surface heater 12. The thermistor 58 thus serves as an anticipator which prevents overshooting of the pan temperature. It is obvious that a considerable time lag occurs between the time when the main surface heating element becomes hot and the time when the pan placed on the surface heating element reaches its desired temperature. Therefore, if one were to delay turning off the heater until the pan reached its desired temperature, then the residual heat in the heater element would cause the pan to overheat. An ambient temperature compensating thermistor 62 is provided in the circuit as shown and compensates for changes in the ambient temperature. The pan sensing thermistor 54 is preferably arranged to contact the bottom center of any pan or skillet which may be placed on the surface heating element. The thermistors 54, 58 and 62 are negative temperature responsive semiconductor resistances.

Any unbalance in the Wheatstone bridge network hereinabove described is supplied to a transistor 64 which is arranged in the circuit as shown. Thus, one output terminal of the bridge is connected to the emitter side 66 of the transistor and the other output terminal of the bridge is connected to the base 68 of the transistor 64. The collector 70 of the transistor is connected to an incandescent lamp 72 arranged to direct a controlled amount of light onto the light dependent resistor 40. The incandescent lamp 72 is connected in series with the secondary transformer winding 50 through a diode 74 which serves to rectify the current in the lamp circuit.

By virtue of the above described circuit arrangement, the user of the range can adjust the resistance 52 by means of a control knob (not shown) so as to provide any desired pan temperature. The pan temperature sensing thermistor 54 then senses the temperature of the pan and controls the amount of light directed onto the light dependent resistor 40 located in the main power circuit. Changing the amount of light on the resistor 40 controls the flow of current to the surface unit 12 by controlling the operation of the four-layer diode 30.

The same reference numerals have been used to designate like parts in FIGURES 1 and 3 and except for the differences indicated, the systems are the same and operate in the same manner to control the flow of current to the heating element.

While the embodiment of the present invention as herein disclosed constitutes a preferred form, it is to be understood that other forms might be adopted.

What is claimed is as follows:

1. In a control circuit for the heating element of an electric range, a source of alternating current power, a heating element, means connecting said heating element to said power source including a silicon controlled rectifier having a gate, a first pair of diodes connected in series with said rectifier and arranged to conduct current through said rectifier in one direction during one portion of each cycle, a second pair of diodes connected in series with said rectifier and arranged to conduct current through said rectifier in said one direction during another portion of each cycle, a four-layer diode and resistance means connected to said gate and to the output side of one of said diodes, and means for varying the resistance of said resistance means so as to vary the breakdown voltage of said four-layer diode.

2. In an electric control system for the heating element on an electric range, the combination, a power source, a heating element, a plural path rectifier network comprising first and second groups of unidirectional conducting devices connected between said power source and said heating element, means for controlling conduction in said paths comprising a silicon controlled rectifier connected in series with said conducting devices and having a pair of current carrying terminals and a control terminal, a four-layer diode and resistance means connected between said control terminal and said power source, and means for varying the resistance means so as to control the flow of current from said power source to said heating element.

3. In an electric range, a surface heating element, means connecting said element to a power source including a network of diodes and a silicon controlled rectifier arranged in said network to control the flow of current to said heating element from said power source, said silicon controlled rectifier including a gate, a four-layer diode connected between said power source and said gate, means controlling the firing voltage of said four-layer diode, said last named means comprising a light dependent resistor connected in series with said four-layer diode, an incandescent lamp arranged to direct light onto said light dependent resistor, means controlling the flow of current through said lamp including a transistor, a Wheatstone bridge circuit for controlling the operation of said transistor, said circuit having a thermistor in one leg thereof arranged in temperature sensing relationship to a pan or the like disposed on said surface heating element, an anticipator thermistor disposed in another leg of said bridge circuit, a heater in thermal exchange relationship with said anticipator thermistor, means connecting said heater in series with said surface heating element, a variable resistance in said bridge circuit controlling the flow of current through said bridge circuit, and an ambient temperature compensating resistor connected in said bridge circuit.

4. In an electric range, a heating element, means connecting said element to a power source including a network of diodes and a silicon controlled rectifier arranged in said network to control the flow of current to said heating element from said power source, said silicon controlled rectifier including a gate, a four-layer diode connected between said power source and said gate, means controlling the firing voltage of said four-layer diode, said last named means comprising a light dependent resistor connected in series with said four-layer diode, an incandescent lamp arranged to direct light onto said light dependent resistor, means controlling the flow of current through said lamp including a transistor, a Wheatstone bridge circuit for controlling the operation of said transistor, said circuit having a thermistor in one leg thereof, an anticipator thermistor disposed in another leg of said bridge circuit, a heater in thermal exchange relationship with said anticipator thermistor, means connecting said heater in series with said heating element, a variable resistance in said bridge circuit controlling the flow of current through said bridge circuit, and an ambient temperature compensating resistor connected in said bridge circuit.

5. In combination, a heating element, means connecting said element to a power source including a network of diodes and a silicon controlled rectifier arranged in said network to control the flow of current to said heating element from said power source, said silicon controlled rectifier including a gate, a four-layer diode connected between said power source and said gate, means controlling the firing voltage of said four-layer diode, said last named means comprising a light dependent resistor connected in series with said four-layer diode, an incandescent lamp arranged to direct light onto said light dependent resistor, means controlling the flow of current through said lamp including a transistor, a Wheatstone bridge circuit for controlling the operation of said transistor, said circuit having a thermistor in one leg thereof, an anticipator thermistor disposed in another leg of said bridge circuit, a heater in thermal exchange relationship with said anticipator thermistor, means connecting said heater in series with said heating element, and a variable resistance in said bridge circuit controlling the flow of current through said bridge circuit.

6. In an electric range, a surface heating element, means connecting said element to a power source including a network of diodes and a semi-conductor switch means arranged in said network to control the flow of current to said heating element from said power source, control means controlling the conductivity of said switch means, said last named means comprising a light dependent resistor, an incandescent lamp arranged to direct light onto said light dependent resistor, means controlling the flow of current through said lamp including a transistor, a Wheatstone bridge circuit for controlling the operation of said transistor, said circuit having a thermistor in one leg thereof arranged in temperature sensing relationship to a pan or the like disposed on said surface heating element, an anticipator thermistor disposed in another leg of said bridge circuit, a heater in thermal exchange relationship with said anticipator thermistor, means connecting said heater in series with said surface heating element, and a variable resistance in said bridge circuit controlling the flow of current through said bridge circuit.

7. In combination, an electrical load, alternating current supply conductors electrically connected to said electrical load, a silicon controlled rectifier connected in series with said load for controlling said load and having a gate, a bridge circuit having input terminals electrically energized from said supply conductors and having output terminals, a first temperature responsive resistance connected between an input terminal and an output terminal of said bridge circuit, a second temperature responsive resistance connected between an input terminal and an output terminal of said bridge circuit, an anticipating heater thermally associated with said second temperature responsive resistance energized coincidentally with the energization of said load, and means including semiconductor amplifying means connected to the output terminals of said bridge circuit for controlling the voltage applied to said gate.

8. In combination, an electrical load, alternating current supply conductors electrically connected to said electrical load, a silicon controlled rectifier connected in series with said load for controlling said load and having a gate, a bridge circuit having input terminals electrically energized from said supply conductors and having output terminals, a first temperature responsive resistance connected between an input terminal and an output terminal of said bridge circuit, a variable resistance connected between an input terminal and an output terminal of said bridge circuit, a second temperature responsive resistance connected between an input terminal and an output terminal of said bridge circuit, an anticipating heater thermally associated with said second temperature responsive resistance energized coincidentally with the energization of said load, and means including semiconductor amplifying means connected to the output terminals of said bridge circuit for controlling the voltage applied to said gate.

9. In combination, an electrical load, alternating current supply conductors electrically connected to said electrical load, a silicon controlled rectifier connected in series with said load for controlling said load and having a gate, a bridge circuit having input terminals electrically energized from said supply conductors and having output terminals, a first temperature responsive resistance connected between an input terminal and an output terminal of said bridge circuit, a second temperature responsive resistance connected between an input terminal and an output terminal of said bridge circuit, an anticipating heater thermally associated with said second temperature responsive resistance energized coincidentally with the energization of said load, an ambient temperature responsive resistance connected between an input terminal and an output terminal of said bridge circuit, and means including semiconductor amplifying means connected to the output terminals of said bridge circuit for controlling the voltage applied to said gate.

10. In combination, an electrical load, alternating current supply conductors electrically connected to said electrical load, a silicon controlled rectifier connected in series with said load for controlling said load and having a gate, a bridge circuit having input terminals electrically energized from said supply conductors and having output terminals, a first temperature responsive resistance connected between an input terminal and an output terminal of said bridge circuit, a second temperature responsive resistance connected between an input terminal and an output terminal of said bridge circuit, an anticipating heater thermally associated with said second temperature responsive resistance energized coincidentally with the energization of said load, means for supplying electrical energy to said gate, a transistor having an emitter connected to one of said output terminals and a base connected to another output terminal of said bridge for controlling the supplying of electrical energy to said gate for controlling the conduction of said silicon controlled rectifier.

11. In combination, an electrical load, alternating current supply conductors electrically connected to said electrical load, a silicon controlled rectifier connected in series with said load for controlling said load and having a gate, a bridge circuit having input terminals electrically energized from said supply conductors and having output terminals, first and second resistances connected between an input terminal and an output terminal of said bridge circuit, means responsive to the current flow through said electrical load for gradually varying the resistance of said second resistance, means including semiconductor amplifying means connected to the output of said bridge circuit for controlling the voltage applied to said gate, and means for gradually varying the resistance of said first resistance to gradually vary the output of said electrical load.

References Cited in the file of this patent

UNITED STATES PATENTS

| | | |
|---|---|---|
| 2,751,549 | Chase | June 19, 1956 |
| 2,751,550 | Chase | June 19, 1956 |
| 2,947,875 | Beck | Aug. 2, 1960 |
| 2,947,915 | Patchell | Aug. 2, 1960 |
| 2,965,771 | Finkel | Dec. 20, 1960 |
| 3,042,781 | Bray | July 3, 1962 |
| 3,065,360 | Vallese | Nov. 20, 1962 |
| 3,097,314 | Harriman | July 9, 1963 |